UNITED STATES PATENT OFFICE.

WM. HORNER, OF WASHINGTON, DISTRICT OF COLUMBIA.

IMPROVED MEDICAL COMPOUND.

Specification forming part of Letters Patent No. 45,410, dated December 13, 1864.

*To all whom it may concern:*

Be it known that I, WILLIAM HORNER, of the city and county of Washington, District of Columbia, have invented a new and useful Medical Composition for the Cure of Inflammatory Rheumatism and other Diseases; and I do hereby declare that the following is a full and exact description of the same.

My composition consists of Madeira wine, aloes, and senna, mixed together in about the following proportions: One quart of Madeira wine, one-half ounce aloes, one-half ounce senna.

I have found by experiment that Madeira wine answers a twofold purpose—viz., it is rich and healthful, and also does not sour the composition if kept a long time before use. The whole compound or composition tends to reinvigorate the system, purify the blood, and remove the causes which induce inflammatory rheumatism and other painful diseases, as many who have tried it have testified in the most solemn manner. If Dutch or sour wines are used, the composition in a short time becomes very disagreeable to the taste, and I believe the useful effects of the medicine are impaired. I therefore discard such wines in making my composition, and use only Madeira or other equivalent wine.

The innocent nature of my composition and the effect of each of the respective ingredients will be readily seen and appreciated by those acquainted with medicine.

The composition is taken in small doses— say a table to two table spoonfuls at a time.

The proportions may be varied in some degree; but those mentioned herein have been found to be the proper ones.

What I claim as my invention, and desire to secure by Letters Patent, is—

The within-described medical composition.

WM. HORNER.

Witnesses:
B. W. FERGUSON,
F. O. CALLAHAN.